United States Patent
Berry, III et al.

(10) Patent No.: US 8,952,791 B2
(45) Date of Patent: Feb. 10, 2015

(54) METHOD AND SYSTEM FOR TRACKING RFID TAGS FOR USE IN ADVERTISING AND MARKETING

(76) Inventors: Lincoln Berry, III, Dayton, OH (US); Justin Lamar Johnson, Trotwood, OH (US); Giacomo Caruso, Mendota, IL (US); Amanda Farkas, Rixeyville, VA (US); Jared Szechy, Fairborn, OH (US); Matthew Fisher, Glenview, IL (US); Phillip Doepker, Dayton, OH (US); Ralph Barrera, Casstown, OH (US); Tom Whitney, Kettering, OH (US)

(*) Notice: Subject to any disclaimer, the term of this patent is extended or adjusted under 35 U.S.C. 154(b) by 8 days.

(21) Appl. No.: 13/407,754

(22) Filed: Feb. 28, 2012

(65) Prior Publication Data

US 2013/0074121 A1 Mar. 21, 2013

Related U.S. Application Data

(60) Provisional application No. 61/464,126, filed on Feb. 28, 2011.

(51) Int. Cl.
*H04N 21/472* (2011.01)
*G06K 7/01* (2006.01)
*H04N 21/81* (2011.01)
*H04N 21/258* (2011.01)
*H04N 21/4725* (2011.01)

(52) U.S. Cl.
CPC ............. *G06K 7/01* (2013.01); *H04N 21/812* (2013.01); *H04N 21/25841* (2013.01); *H04N 21/4725* (2013.01)

USPC .................... 340/10.42; 340/10.1; 340/572.4; 340/539.13; 340/568.1; 340/572.1; 725/60; 375/E7.007; 375/E7.008

(58) Field of Classification Search
CPC ............ H04N 21/472; H04N 21/4722; H04N 21/4725; H04N 21/2542; G06K 2012/0045
USPC .......... 340/10.1, 572.4, 539.13, 568.1, 572.1, 340/10.42; 725/60; 375/E7.007, E7.008
See application file for complete search history.

(56) References Cited

U.S. PATENT DOCUMENTS

| | | | |
|---|---|---|---|
| 2003/0131357 A1* | 7/2003 | Kim | 725/60 |
| 2003/0149983 A1* | 8/2003 | Markel | 725/51 |
| 2004/0169587 A1* | 9/2004 | Washington | 340/573.1 |
| 2005/0229227 A1* | 10/2005 | Rogers | 725/115 |
| 2005/0285742 A1* | 12/2005 | Charych et al. | 340/572.1 |
| 2008/0042847 A1* | 2/2008 | Hollister et al. | 340/572.7 |
| 2008/0143481 A1* | 6/2008 | Abraham et al. | 340/10.1 |
| 2010/0235391 A1* | 9/2010 | Eklund, II | 707/780 |
| 2010/0283678 A1* | 11/2010 | Ketonen | 342/357.49 |

* cited by examiner

*Primary Examiner* — Andrew Bee
(74) *Attorney, Agent, or Firm* — Mark F. Smith; Smith Brandenburg Ltd

(57) ABSTRACT

The current invention is a method and system for tracking an RFID tag within a defined 3D space and can be used to identify objects within a live performance and create hotspots with respect to the objects, which allows viewers the ability to select objects that are associated with one of the hotspots, and transmits their interest in the selected object to one or more users. Preferably, the system operates such that hotspots can be created for previously created video, newly created video media, as well as live broadcasts.

14 Claims, 16 Drawing Sheets

METHOD AND SYSTEM FOR TRACKING RFID TAGS FOR USE IN ADVERTISING AND MARKETING

CROSS-REFERENCE TO RELATED APPLICATION

The present application claims benefit of U.S. Provisional Patent Application having Ser. No. 61/464,126, filed Feb. 28, 2011, the disclosure of which is hereby incorporated by reference in its entirety, and U.S. patent application having Ser. No. 13/136,423, filed Aug. 1, 2011, the disclosure of which is hereby incorporated by reference in its entirety.

BACKGROUND OF THE INVENTION

The present invention relates to a method and system for tracking RFID tags, and more particularly to a method and system for tracking RFID tags in three-dimensional (3D) space, such as for use in advertising and marketing.

Video advertising and marketing systems using video media that provide a collaborative process in which users, such as advertisers, can incorporate material, such as advertisements, information, documents and other such items (hereinafter referred collectively as "information"), can be placed in various video media, preferably digital video media, and whereby viewers can communicate with users concerning the information are known.

Audiences today are often confronted with a daily surplus of social information that competes for an individual's attention in almost every aspect of their work, recreation, and social lives. A popular form of advertising on large private or public networks, such as the Internet, is through the use of video files that provide short digital video transmissions, known as "streaming." Individuals also generally frequently view web sites to obtain information, such as news, weather information, entertainment information, broadcast information, much of which is communicated using digital video files. Such individuals also utilize other various video media for obtaining information and communicating with other viewers. Thus, because such media provides access to a large population, businesses seek and use such media to advertise their products and services.

Use of advertising in such video media has increased significantly in recent years with the advent of new telecommunication means, including cell phones, texting, TWITTER and the Internet. Such telecommunication means have been successful in connecting large numbers of people through various means that include online bulletin boards, Email, Tweeting, and online instant messaging. Accordingly, a single video media is often shared among a great number of people.

An assortment of such video media that is frequently viewed or downloaded contain hotspots (certain defined "clickable" areas in a digital video media) that have been embedded or incorporated within the video media. Such hotspots include defined areas that are typically associated with an image shown in the video media such that when the viewer "clicks" on an area incorporating the hotspot a certain action results. This action may include establishing communication with a user, such as an advertiser, by use of a hyperlink to an advertiser's web site, or may present information directly on the viewing display relating to the image. One problem with use of conventional hotspots is that each hotspot corresponding to an object must be placed within the video media prior to viewing by the public. Further, an object traveling through a defined three-dimensional (3D) space, such as in a live broadcast, must be tracked in order to attach a hotspot to such an object. Accordingly, current systems incorporating hotspots in video media typically cannot be used to incorporate or embed hotspots in live video broadcasts, such as a live television or sports broadcast.

One system that has been developed for tracking objects is by use of RFID (Radio Frequency Identification) tag systems. Such systems are typically described as being "passive" such that they operate without a battery or other such power source but instead draw power from the electric field emitted from RFID receivers or transmitter/readers; being "active" such that they operate using power such as by way of a battery; or being battery-assisted passive (BAP), such that the tag has a small battery on board that is activated when in the presence of a RFID reader. Since passive RFID tags do not have their own power source, when they are not within the effective range of the transmitter and reader ("reader"), they are non-functional. When they come within the effective range of the reader they are able to transmit their unique ID to the reader. However, the reader typically has no ability to determine the distance or orientation that the RFID tag is from the reader. Unfortunately, active tags are generally significantly more expensive than passive tags and are undesirable or cost prohibited for use in many application.

Objects having RFID tags, either passive, BAP, or active tags, have been tracked using antenna arrays. Such arrays typically have a plurality of orthogonally oriented antennas electronically coupled to an RFID reader and are operated such that readings from each antenna are read separately. Such systems ensure that an RFID tag can be read no matter what orientation the tag may be in and can confirm that an object is within a 3D space. However such systems are unable to determine the particular position or location of the object within the 3D space and cannot tack the object with the RFID tag in real-time as the object travels within the 3D space. Accordingly, such systems cannot be effectively used for creating hot spots for objects used in live performances or for objects traveling through a defined 3D space.

Accordingly, what is needed is an interactive advertising and marketing system for video media that provides a system and method in which users, such as advertisers, can identify objects within a 3D space such as during a live broadcast, and track the movement of the object within the 3D space thereby allowing users to create hotspots for objects within the video media, and which allows viewers to select such hotspots for communicating with and interacting with users.

SUMMARY OF THE INVENTION

Preferably, the method and system allows users, such as advertisers, to place RFID tags of various objects located within a 3D space and allows such RFID tags to be tracked in real time as the object travels within the 3D space. Users can assign to the object to be tracked an RFID tag that operates to identify the object such as through the use of hotspots as well as allowing the object to be tracked as it travels through the 3D space. Such created hotspots allow information such as through a video media, to be communicated to viewers, such as potential customers.

In a preferred embodiment of the invention the video media includes television broadcasts and clips, DVD's and BLU-RAY optical discs, movies and movie clips, music videos, video files, streaming videos over Internet, and other such video media (hereinafter referred collectively as "video media"). Consumers or viewers (collectively referred to herein as "Viewers") can then select objects within such video media and utilize the advertisement and marketing system to communicate and interact with users and other viewers.

In another preferred embodiment of the invention the system operates to provide users with an opportunity to create hotspots of objects within a 3D space which can be incorporated into a video media. Such hotspots allow viewers the ability to select objects within the video media that are associated with one of the hotspots, and transmit their interest in the selected object to one or more users.

In a preferred embodiment of the invention the system comprises at least one directional antenna for receiving transmission from an RFID tag.

In another preferred embodiment of the invention the system comprises at least one directional antenna mounted to a two-axis gimbal effective for panning and tilting to cover a defined space.

In a preferred embodiment of the invention the system comprises means for automatically moving the direction of the antenna to cover the defined 3D space.

In another preferred embodiment of the invention the system includes a plurality of antennas placed circumferentially around a defined space and operates by determining signal time and strength of an RFID signal to calculate the location of the object within a defined space.

In a preferred embodiment of the invention, the method and system for tracking RFID tags in three-dimensional (3D) space use in advertising and marketing provides users with means for receiving information, such as specific business information concerning the viewer's demographics and other information concerning the effectiveness of the advertising.

In another preferred embodiment of the invention the method and system for tracking RFID tags in three-dimensional (3D) space for use in advertising and marketing allows advertising to be incorporated into video media whereby viewers can select "click" objects and interact with users.

In another preferred embodiment of the invention the method and system for tracking RFID tags in three-dimensional (3D) space provides users the ability to obtain viewer information for sending track able coupons, maps, and other customized information materials to the viewers.

In another preferred embodiment of the invention the method and system for tracking RFID tags in three-dimensional (3D) space for use in advertising and marketing provides users the ability to embed hotspots into various video media that can be transmitted to other viewers such as by Email, TWITTER communication, FACEBOOK pages, and other similar communication systems.

In another preferred embodiment of the invention, the method and system for tracking RFID tags in three-dimensional (3D) space for use in advertising and marketing operates to place a viewer's display device adapted for receiving transmission of video media in communication with the system for identifying hotspots within a video media.

In a preferred embodiment of the invention the system software operates in conjunction with the video display such that when material is selected by a viewer the video display transfers a video image ("snapshot" or "screenshot") of the video media to the system which then directs the system software to operate and calculate the coordinates of the area selected by the user and stores the video image in a data bank or "cloud".

In another preferred embodiment of the a method and system for tracking RFID tags in three-dimensional (3D) space for use in advertising and marketing the video media is operable on assortment of devices capable of viewing video media.

In a preferred embodiment of the method and system for tracking RFID tags in three-dimensional (3D) space for use in advertising and marketing the invention comprises an assortment of devices capable of utilizing web pages, Emails, Twitter feeds, cellular transmittals, cellular text messages, Internet instant messages, and social network systems.

Preferably the method and system for tracking RFID tags in three-dimensional (3D) space for use in advertising and marketing comprises objects in a video media and by viewers for selecting such objects, comprises a data bank having a plurality of hotspots, each hotspot is directed to a corresponding object, a viewer video display device operable for receiving and displaying a video media, a selection device or method for selecting an object in the video media, and a system framework in communication with the data bank "cloud" and the viewer display device and operable for determining if a hotspot exists for the selected object; wherein if a hotspot exists for the selected object, the user/viewer module directs the video display device to generate a dialogue (such as a window) for allowing a viewer to correspond with a user.

In a preferred embodiment, the viewer video display device is selected from the group consisting of televisions, cellular telephones, computer displays, personal digital assistants, and video game consoles.

Another preferred embodiment of the invention the method and system for tracking RFID tags in three-dimensional (3D) space for use in advertising and marketing comprises the steps of: attaching an RFID tag to an object, tracking the coordinates of the RFID tag as the object travels through the defined 3D space, using the RFID tag and the time and coordinates of the RFID tag to create a hotspot, identifying a viewer, the viewer selecting an object in a video media having a created hotspot, calculating the coordinates of the selected object at a particular time, using the coordinates and the particular time to identify any hotspots for the object in the video media, using the hotspot to identify the object and a user associated with the object, and providing a dialogue whereby the viewer and the user may communicate.

In a preferred embodiment of the invention the video media is displayed on a viewer display device.

In a preferred embodiment the viewer can contact the user using an Internet connection.

In a preferred embodiment a viewer can contact the user using a dialogue, such as a window, appearing on the viewer's display device.

In a preferred embodiment of the invention the dialogue operates to allow a viewer to receive and transmit messages to other viewers.

In a preferred embodiment of the invention the dialogue operates to allow a user to receive and transmit messages to viewers.

These and other benefits, advantages, and embodiments of the invention will be apparent from the following description, the accompanying drawings and the appended claims.

BRIEF DESCRIPTION OF THE DRAWINGS

Features, aspects, and advantages of the present invention will become better understood with regard to the following description, appended claims, and accompanying drawings where:

DETAILED DESCRIPTION OF THE PREFERRED EMBODIMENT

The present invention solves the prior art problems discussed above and provides a distinct advance in the state of the art. The method and system for tracking RFID tags in three-dimensional (3D) space, such as for use in advertising and marketing, provide users with an opportunity to mark, identify, and locate objects using an RFID tag which when located and tracked within a 3D space operate to create hotspots within a video media. Such hotspots allow viewers the ability to select ("click") an object within the video media that is associated with the hotspot, and transmit their interest in the object to a user. The ability to track and locate an RFID Tag within a defined 3D space allows hotspots to be created for objects in live broadcasts. It should also be understood that the ability to track an RFID tag within a 3D space has many other applications, such as but not limited to, tracking objects within a defined 3D space, tracking objects within a defined 2D space, tracking objects entering or leaving a defined 3D space, identifying objects within the 3D space, identifying objects within the 2D space, and monitoring the movement of the object within the 3D space or 2D space.

Figure 1:
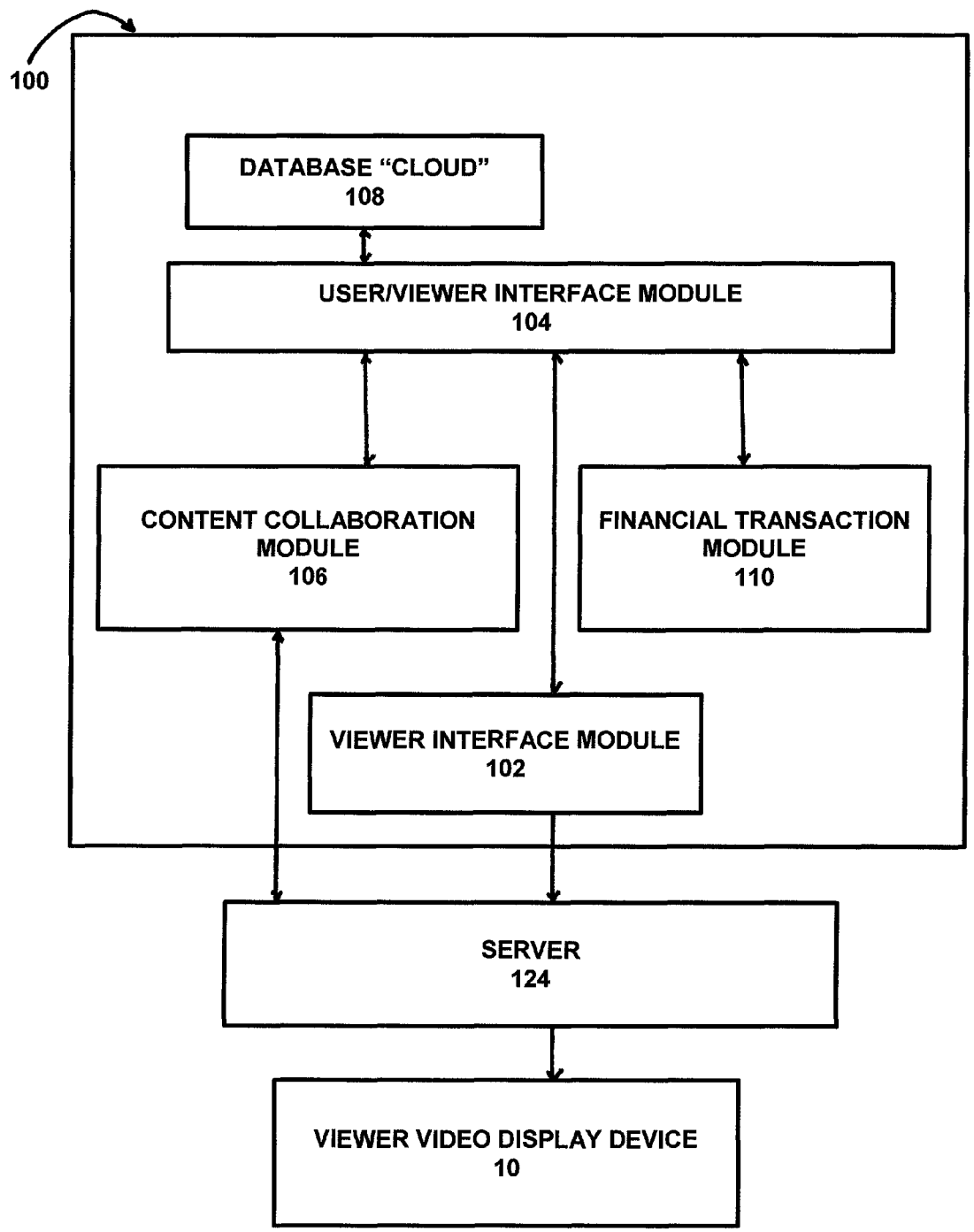
FIG. 1 is a diagrammatic representation showing the general methodology of the interactive advertising and marketing system of the subject invention showing a user/viewer interface module, a content collaboration module, a viewer interface module, and a financial transaction module, and having a database or cloud for storing information.

In a preferred embodiment, as shown in FIG. 1, the method and system for tracking RFID tags 100 within a defined 3D space comprises a viewer interface module 102 for communicating with a viewer through the viewer's video display device 10, a user/viewer interface module 104 in communication with the viewer interface module 102 to receive and transmit information concerning an object, a content collaboration module 106 for allowing users to work together in populating a data bank or "cloud" 108, and a financial transaction module 110 for carrying on a financial transaction between a viewer and a user.

Figure 2:
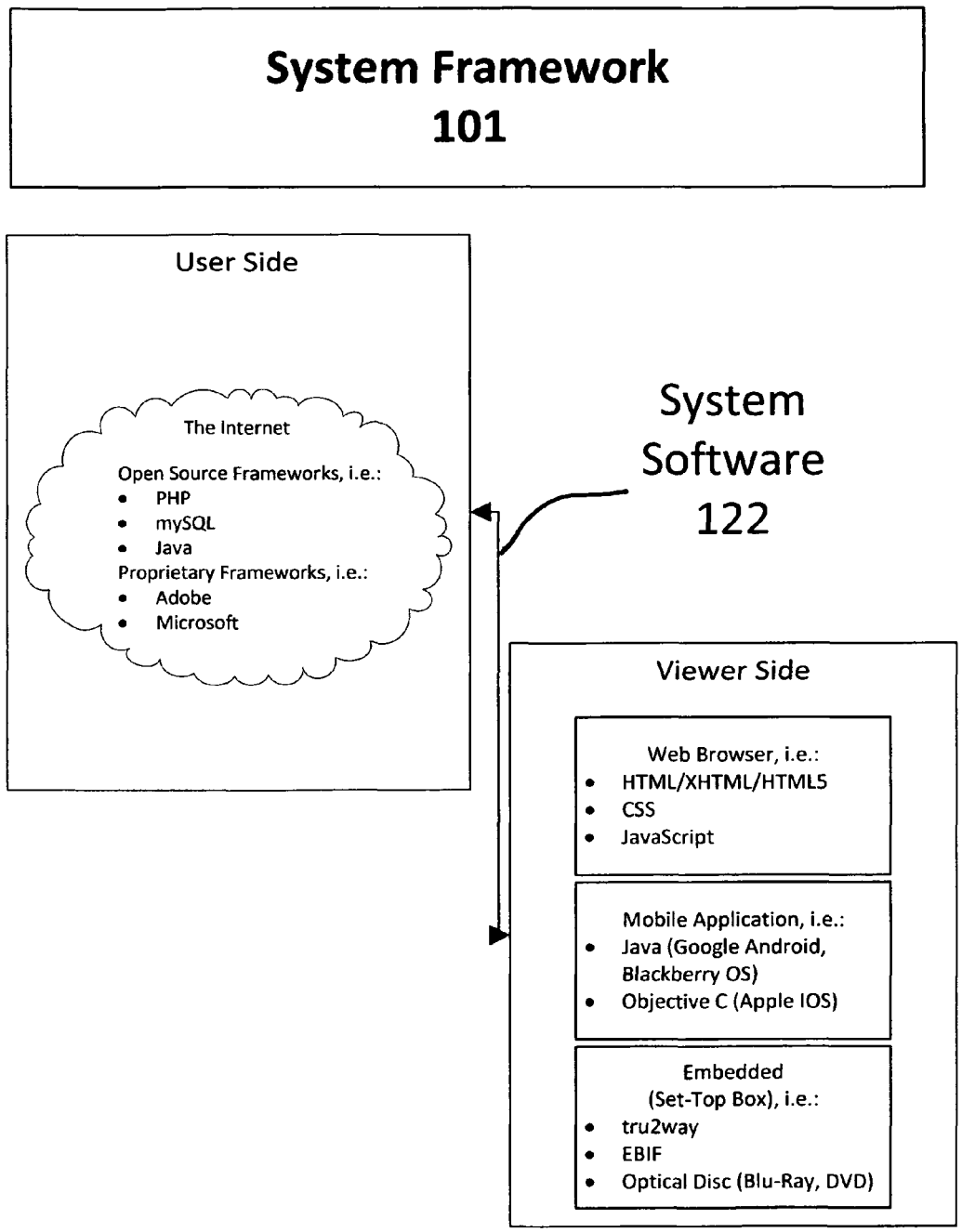
FIG. 2 is a diagrammatic representation showing a preferred embodiment of the system framework of system software for use by users and viewers in implementing the interactive advertising and marketing system of the subject invention.
Figure 4:
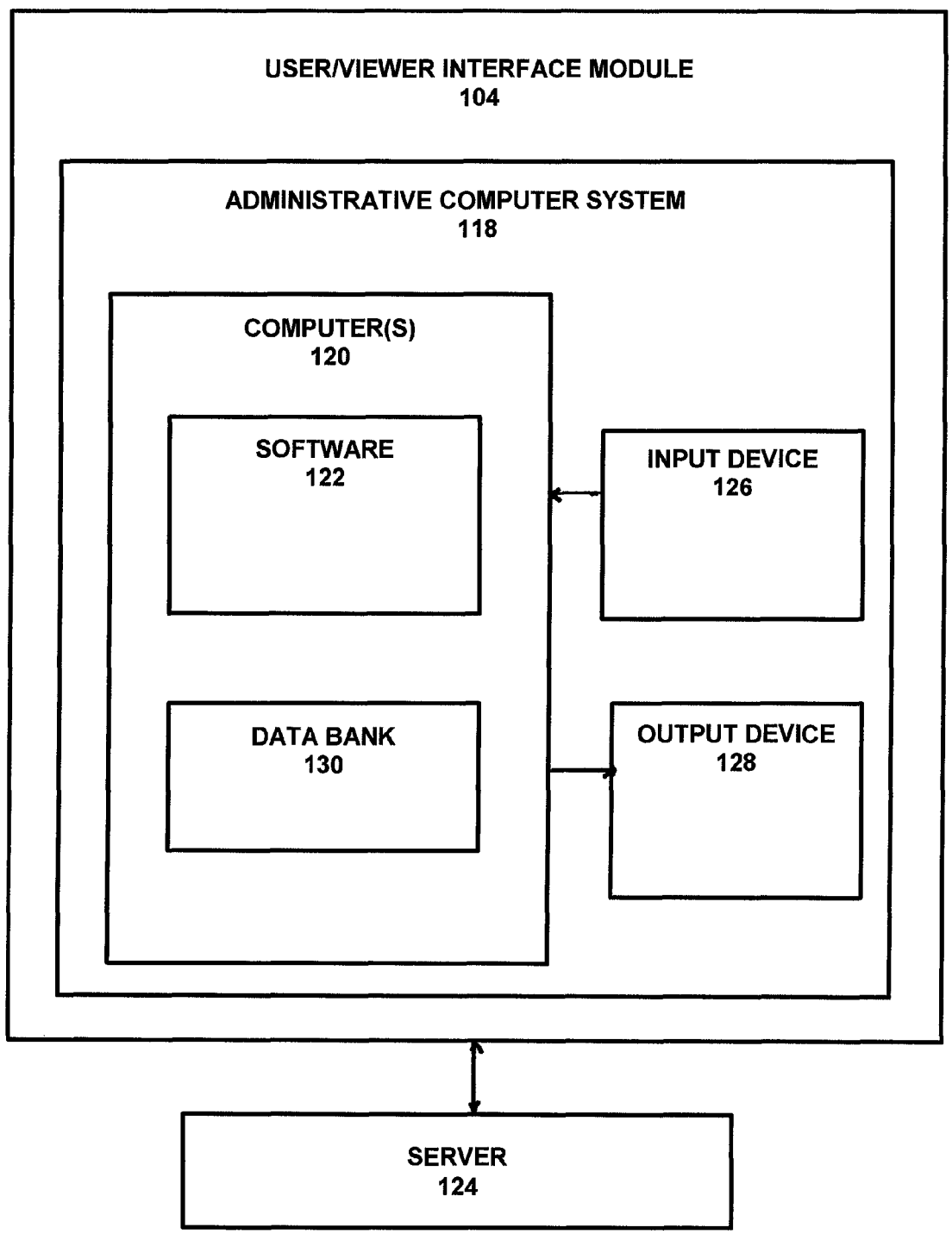
FIG. 4 is a diagrammatic representation of a preferred embodiment of the user/viewer interface module of FIG. 1 showing the administrative computer system.

Referring to FIGS. 1 and 4, the viewer interface module 102 operates for receiving incoming messages and alerts (i.e. RSS feed), and dispatches messages and alerts (i.e. HTTP requests, URL/URI encoded streams) from and to a viewer's video display device 10. Further, the viewer interface module 102 also operates to hosts "widgets" (i.e. small runtime applets, such as games or informational dialogues that function independently of one another). Preferably, as shown in FIG. 2, the viewer interface module 102 includes a system framework 101 and an application programming interface 112 operable for use with interactive television software (such as JAVA TV from Oracle Corporation) and alongside of or on top of other existing software frameworks such as across a broadcast television interface 114 (such as "TRU2WAY" interactive digital cable services system from Cable Television Laboratories, Inc.; ANDROID software stack from Google Inc.; Google TV participatory information system from Google Inc.; and "TIVO" digital video recording by TiVo, Inc.) and/or an Internet (web) application interface 116 that uses a multimedia platform for adding video to Internet web sites 12 (such as ADOBE FLASH from Adobe Systems). The viewer interface module 102 utilizes an appropriate scripting language for controlling one or more applications (such as ECMA SCRIPT from Ecma International). It should be understood that the Internet (web) application interface 116 can operate utilizing any fully-realized runtime code using an appropriate language for structuring and presenting content on the Internet (such as HTML5) thereby allowing the Internet (web) application interface 116 to be accessed and communicate with a variety of web browsers and web sites 12 having meta-file format or container file format (Flash Video). In this way a viewers' video display device 10 can comprise computer displays and other devices accessing video media through various Internet web sites 12 or IPTV.

Figure 3:
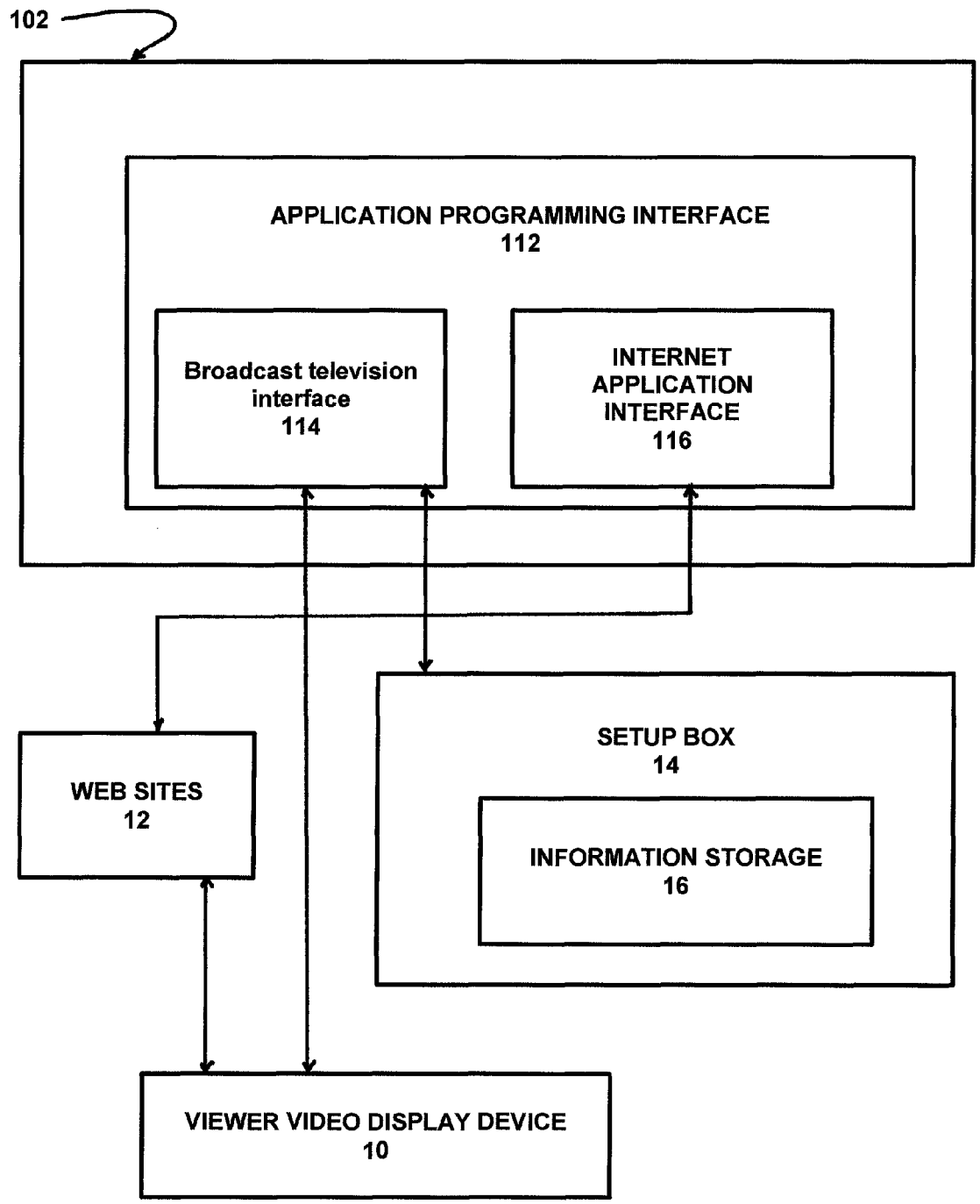
FIG. 3 is a diagrammatic representation showing the application programming interface having a broadcast television interface and an internet application interface for communicating with a viewer's video display device.

As illustrated in FIG. 3, in a preferred embodiment, the application programming interface 112 is coupled to a viewer's video display device 10, such as a television, by either a Set-Top Box 14 or the display device 10 and is an Internet-capable television connected to the Internet. In a preferred embodiment of the invention, the television is coupled to the Internet I such that constant interaction is provided. In another preferred embodiment of the invention the viewer's video display device is connected to a set-up box 14 that preferably includes a conventional information storage apparatus 16 capable of intermittently caching relevant information until the application programming interface 112 makes transmittal contact, such as with the Internet I, and operates to transmit stored cached information to the application programming interface module 112. In another preferred embodiment of the invention, the viewer's video display device 10 comprises other forms of devices that can display video media and are connected continuously or periodically to the Internet. Such devices include cellular telephones, computers, personal digital assistants ("PDA"), video game consoles, and other such devices.

Referring to FIG. 4, the user/viewer interface module 104 comprises an administrative computer system 118 comprising one or more computers 120 for implementing and operating the system software 122 that operates such that the various modules cooperate together. The user/viewer interface 104 and the viewer interface module 102 are each electrically linked to at least one server 124 connected to the Internet I to assess, retrieve and transmit information. The computer system(s) 118 is electronically coupled to suitable input device 126, like a keypad, touch screen, or any other suitable input device that can accept information and one or more suitable output devices 128, such as a computer display, printer, and the like. The administrative computer system also includes at least one data bank 130 for storing various information, including information concerning users, viewers, and business information. It should be understood that the administrative computer system 118 can include various combinations of such conventional components, peripherals, and devices. Preferably, the administrative computer system 118 operates under the control of an operating system, such as the WINDOWS operating system developed by Microsoft Corporation or the MACINTOSH operating system developed by Apple Computer Corporation. It should be understood, however, that other operating systems could be utilized to implement the system software 122 of the advertising and marketing system 100 of the present invention.

The system software 122 preferably is a computer-readable medium having computer-readable instructions for performing a method of operating the system, including providing support for creating and/or editing hotspots, determining coordinates of objects within a video media, and performing and coordinating the activities of the various modules comprising the system. Preferably, the system software 122 is also an interactive, menu and event driven system that cooperates with the server 124 (FIG. 4) for using conventional type of prompt, dialog, and entry windows to guide a user to enter information for facilitating communications and information exchange between individual users, viewers, and the system 100. As used herein, the term "software" refers to any form of programmed machine-readable language or instructions (e.g., object code) that, when loaded or otherwise installed, provides operating instructions to a machine capable of reading those instructions, such as a computer. The system software 122 of the present invention can be stored or reside on, as well as be loaded or installed from, one or more floppy disks, optical disks, hard disks or any other form of suitable non-volatile electronic storage media and can also be installed by downloading or other form of remote transmission, such as by using Local or Wide Area Network (LAN or WAN)-based, Internet-based, web-based or other remote downloading or transmission methods. It should be understood that the system software 122 can be a single program or can be a combination of existing software such as identified herein that operate together under a framework to perform the operations described herein.

In operation, as illustrated ins FIGS. 1-4, the user/viewer interface module 104 sends and receives messages and data to and from viewers through the viewer interface module 102. The user/viewer interface module 104 can also send and receive messages and data to and from users through the content collaboration module 106. It should be understood that the viewer interface module 102 and the user/viewer interface module 104 operates bi-directionally between a variety of messaging protocols, including Email, SMS text, various social networks, as well as proprietary Internet chat protocols, such as SKYPE and AOL's Instant Messenger system and other similar systems. The messages and data can then be made available to viewer's and user's display devices through the user/viewer interface module 104.

Figure 5:
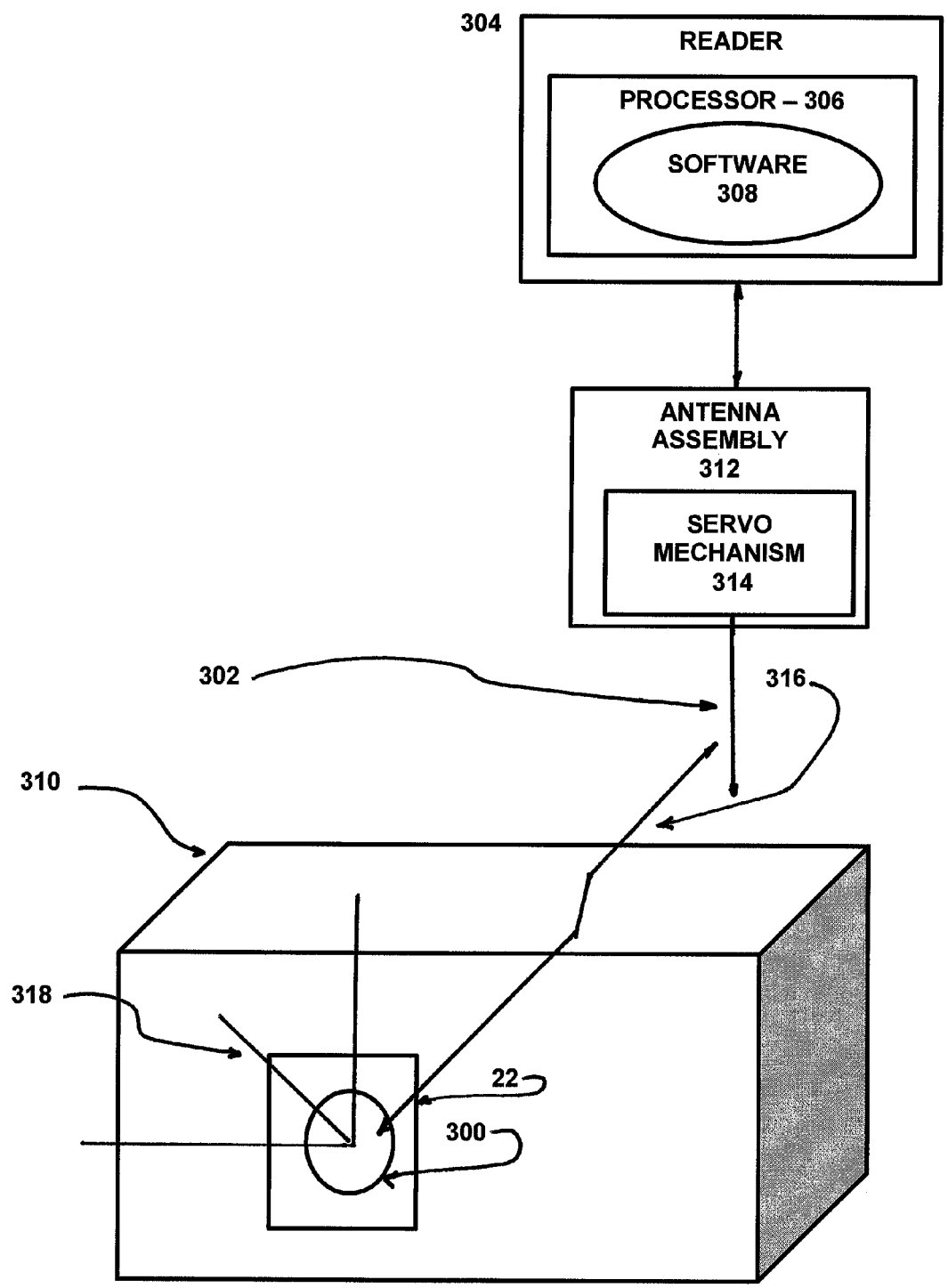
FIG. 5 is a schematic illustration showing of a preferred embodiment of the system of the invention showing at least one directional antenna for transmitting and receiving signals to and from an RFID tag attached to an object.

In a preferred embodiment, the system 100 operates to allow hotspots 134 to be created for live broadcasts and performances. Referring to FIG. 5, the system 100 further comprises one or more RFID tags 300 attached to one or more objects 22 for receiving and transmitting a signal, at least one antenna 302 for receiving a transmitted signal from an RFID tag 300 or for transmitting a signal to an RFID tag 300, and a reader/transmitter ("reader") 304 electronically coupled to the antenna(s) 302. Preferably, the reader 304 is in communication with a processor 306 (or a computer or other like means) having reader software 308 which operates to use the signals for calculating positional coordinates of the RFID tag 300 within a defined 3D space 310. In a preferred embodiment, the RFID tag 300 is a passive RFID tag but it should be understood that in other preferred embodiments the RFID tag is an active RFID tag. In a preferred embodiment the RFID tag is a 2.45 GHz active RFID tag. The reader 304 is a conventional RFID reader/receiver that preferably operates with conventional 915 MHz passive RFID tags, but it should be understood that other RFID readers can be utilized depending on the particular RFID tags being used.

In a preferred embodiment of the invention the antenna(s) 302 is designed for use in the 2.4 GHz frequency band range with a gain of about 14 dBi indoor/outdoor directional antenna. Preferably the antenna has a beam width of about 30 degrees horizontal and 30 degree vertical and is mounted to an assembly 312, such as a two-axis gimbal assembly that operates to pan and tilt the antenna 302 in a predetermined pattern to cover an entire defined 3D space 310. The assembly 312 includes a servo mechanism 314 operationally coupled to the antenna 302 for panning and tilting the antenna 302. Preferably, the servo mechanism 314 uses two servos each having about 145 Oz-in of torque with a rotation speed of about 0.13 sec/60 degrees, and with 180 degrees range of rotation, controlled by a pulse width modulated (PWM) signal. The use of such a servo mechanism 314 permits the antenna 302 to point in the direction of and pick up the RFID signal 316 being transmitted within the defined 3D space 310 or for permitting the RFID signal 314 to be transmitted to an RFID tag 300. It should be understood that the servo mechanism and the particular servos utilized can vary depending on the size of the antenna, the gimbal assembly, and the dimensions of the 3D space.

The processor 306 and reader 304 operate together with the reader software 308 to calculate the positional coordinates 318 of the RFID tag 300 within the defined 3D space 310. The reader software 308 further operates and directs the servo mechanism 312 to tilt and pan the antenna 302 in a scan like predetermined pattern while recording the direction of the antenna 302. Preferably, the reader 304 is coupled to the administrative computer system 118 to provide an interface, to allow users to instruct the reader software 308 to provide electronic commands directing the servo mechanism 312 to pan and tilt the antenna 302 through a maximum and minimum range of antenna angles for covering the entire defined 3D space 310 as well as allowing users to instruct the reader software 308 to provide electronic commands that adjust the speed of the servo mechanism 314. It should be understood that the speed of the servo mechanism 314 is adjusted based on various factors, including the dimensions of the 3D space, the number of RFID tags within the 3D space, the number of RFID tags entering or leaving the 3D space, and the speed that the objects (RFID tags) are traveling within the 3D space.

In operation, the reader 304 transmits one or more signals 316 (a unique identity code) into the defined 3D space 310 at a plurality of particular frequencies. AN RFID tag 300 receives the signal 316 and conventionally modulates its unique identity code and re-transmits the modulated RFID signal 316. The modulated RFID signal 314 is received by the antenna 302 which transfers the signal 316 to the reader 304. The processor 306 operates the reader software 308 that calculates the transmission time that it took for the signal 314 to be transmitted by the reader 304 and received by the RFID tag 300 and for the responding RFID signal 316 to be transmitted from the RFID tag 300 and received by the reader 304. The total transmission time together with the direction of the antenna 302 allows the reader software 308 to precisely determine the RFID tag's 300 position within the 3D space 310. Accordingly, by measuring the transmission time of the signal 316 and its direction allows the reader software 300 to derive the precise location of the RFID tag 300 (and the object that it is attached to) within the defined 3D space 310 and the time it occupied such location. It should now be understood that by actively transmitting and receiving signals the movement of an RFID tag and its associated object can be continuously tracked within the defined 3D space as well as the time the object was at a certain position within the 3D space.

Figure 6:
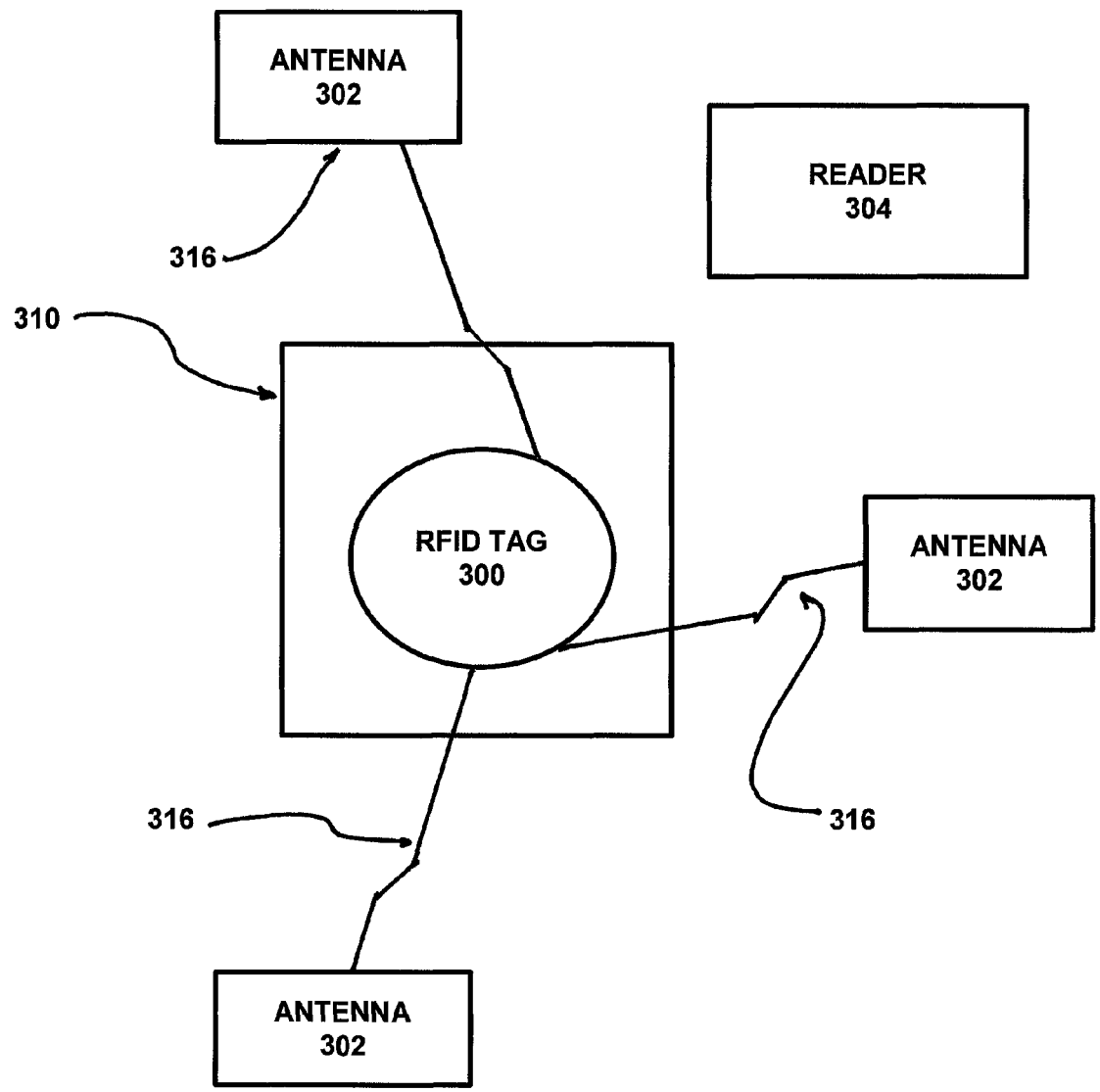
FIG. 6 is another schematic illustration of another preferred embodiment of the invention showing a plurality of antennas arranged around a defined space for transmitting and receiving signals to and from an RFID tag.

In another preferred embodiment of the invention, as shown in FIG. 6, the system comprises a plurality of antennas 302 arranged around the defined 3D space 310. Preferably, at least at least three antennas are needed to determine the location of the RFID tag within the 3D space. However, depending on the size of the defined 3D space, additional antennas can be used to increase the accuracy of the measured location of the RFID tag. Signals 316 being send by an RFID tag 300 within the 3D space 310 received by the multiple antennas and transmitted to the reader 304 and by measuring the angle of arrival and signal time from each antenna 302, the processor 306 using conventional triangular technique.

In another preferred embodiment of the invention the system operates by varying the strength of the signal that can be received by the antenna such that the processor operates to determine the distance between the antenna and the RFID tag. By setting the strength of the signal to a particular level is used to limit the range of the RFID tag. For an illustrative example, if a first RFID tag is about nine feet away from the antenna and a second RFID tag is fourteen feet away from the antenna, by first setting the strength of the signal that can be detected by the antenna such that an RFID tag of more than ten feet cannot be detected, then only the first RFID tag will be detected, by then setting the detectable strength of the signal to fifteen feet, then both RFID tags will be detected. Accordingly, the processor will operate to determine that the second RFID tag is between ten and fifteen feet away.

Figure 16:
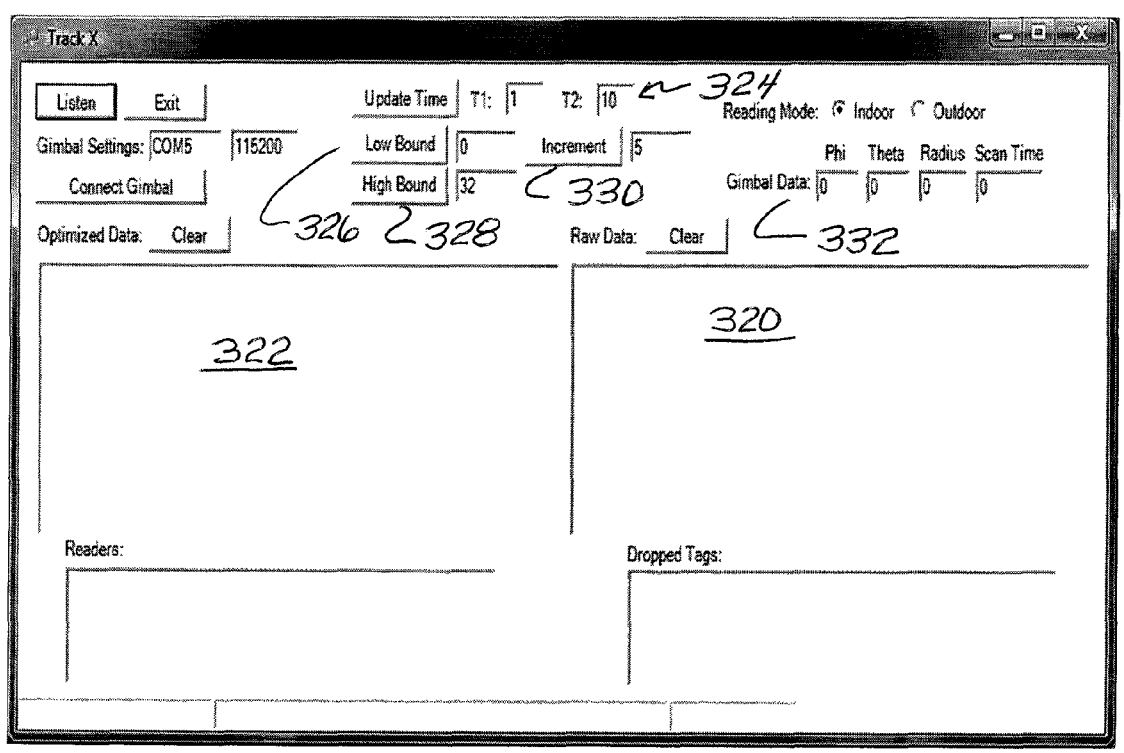
FIG. 16 is an illustrative example of an output page generated by the reader software for display on a user's display device.

In a preferred embodiment, as shown in FIGS. 5 and 16, the reader software 308 operates to read the various RFID tag signals that identify the specific RFID tag 300 together with calculating the location (coordinates 154) of the RFID tags 300 and displays the RFID tag information on a user's output display 128 in the form of an output page 318. Preferably, the information regarding an RFID tag is provided as a raw data display field 320 (output readings taken straight from the reader) and as an optimized data display filed 322 whereby RFID tag locations are determined and intermediate values are created if there is a substantial change in their readings. Preferably, the output page 318 also provides time value fields 324 that instructs the reader software 308 to adjust the timing of the readings, where T1 is the minimum time between two RFID tag data readings and T2 is the maximum time before the reader sends an empty data reading to the computer (meaning no RFID tags have been read). The output page 318 also provides a low bound input field 326 and a high bound input field 328 that allows the user to instruct the reader software 308 to adjust the signal being sent by the antenna within certain bounds, an increment field 330 that allows a user to instruct the reader software 308 to set the increment of signal adjustment, and a gimbal output field 332 that allows a user to review the position and direction of the antenna.

Once the reader software 308 has identified the RFID tag 300, and the object 22 associated with that particular RFID tag 300, and the location (coordinates 154) of the RFID tag 300 within the defined 3D space 310 for a defined timeline (the particular time and location that the object is at during any particular point in time) are recorded as video hotspots 134 in the digital video media (such as a recording of the live performance) and stored within the database or cloud 108.

Figure 7:
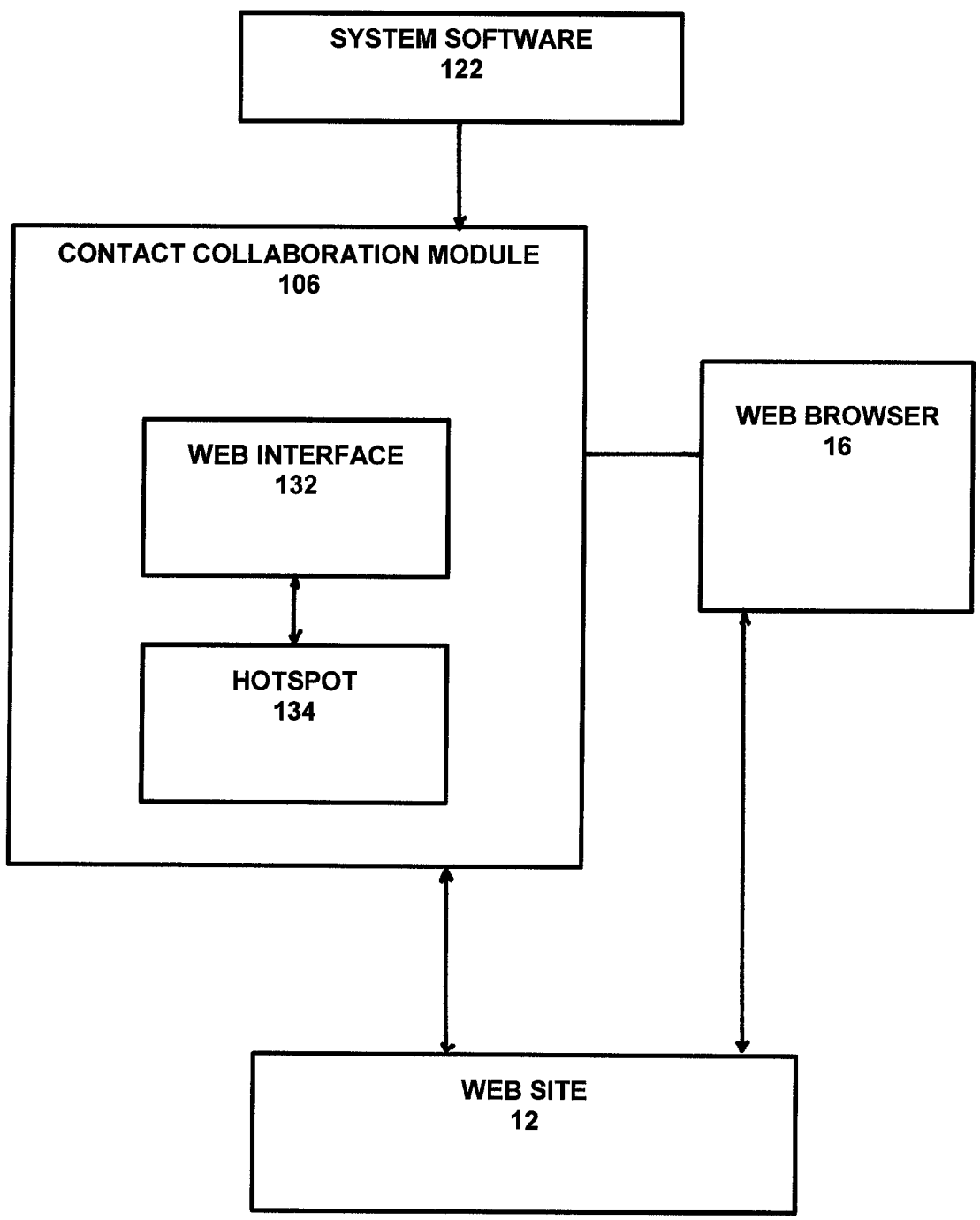
FIG. 7 is a diagrammatic representation illustrating the content collaboration module to create and manage points-of-sale and advertising campaigns as well as video hotspots that can be linked to a user's existing website.

Referring to FIGS. 1 and 7, the content collaboration module 106 is shown for providing services to users. In operation, the content collaboration module 106 allows users to utilize a conventional web browser 16 to create and manage points-of-sale and advertising campaigns. The system software 122 directs the content collaboration module 106 to utilize video hotspot 134 that are linked directly to a user's existing website 12 using standard Uniform Resource Indicator/Locator protocols. The video hotspots 134 are also displayed as a set of visual points along a timeline, which displays a time image. This results in users not needing to know any programming languages to utilize the interactive advertising and marketing system of the present invention. In another preferred embodiment, the system also operates to allow users to import data to the timeline in the form of XML (i.e. time events as SMIL, or shapes (hotspots) as SVG).

In another preferred embodiment of the invention, the system software also directs the content collaboration module 106 to operate and allow a user to upload and import graphics that can be displayed, such as over a digital video medium, in real-time. It should now be understood that the graphics can be used as icons, banner ads, messages, and stencils that appear over top of live television. For an illustrative example, a can of beverage can be "re-labeled" with such stencils.

In another preferred embodiment the system software 122 also directs the collaboration module 106 to collect and collate reported information and data, which can be transmitted to users. This information can then be used by users in evaluating the advertising value created, hence "analytics." Such information can be obtained from advertising hosts, such as websites that provide video media that can include the number of individuals viewing the video media, track of the number of objects and the particular objects being selected by a viewer of a video media, as well as the demographics of the individuals viewing the video media, and other information that may be of interest to users. This information can then be used to tailor marketing and advertising activities to specifically attract specific types of viewers. Further, users can define parameters to allow them to target viewers falling within a set of demographics.

The financial transaction module 110 operates to allow viewers to make transactions with specific users. Viewers selecting objects viewed on a video media can select or "click" on the object and purchase it from the user or can request additional information from the user. The financial transaction module communicates with the user/viewer interface module 104 and utilizes various conventional software applications, such as online shopping carts, online banking systems, and other well-known systems for making financial transactions. In another preferred embodiment, the financial transaction module 110 operates in conjunction with conventional e-commerce businesses allowing payments and money transfers to be made through an Internet third-party, such as PAYPAL from eBay Inc.

Figure 8:
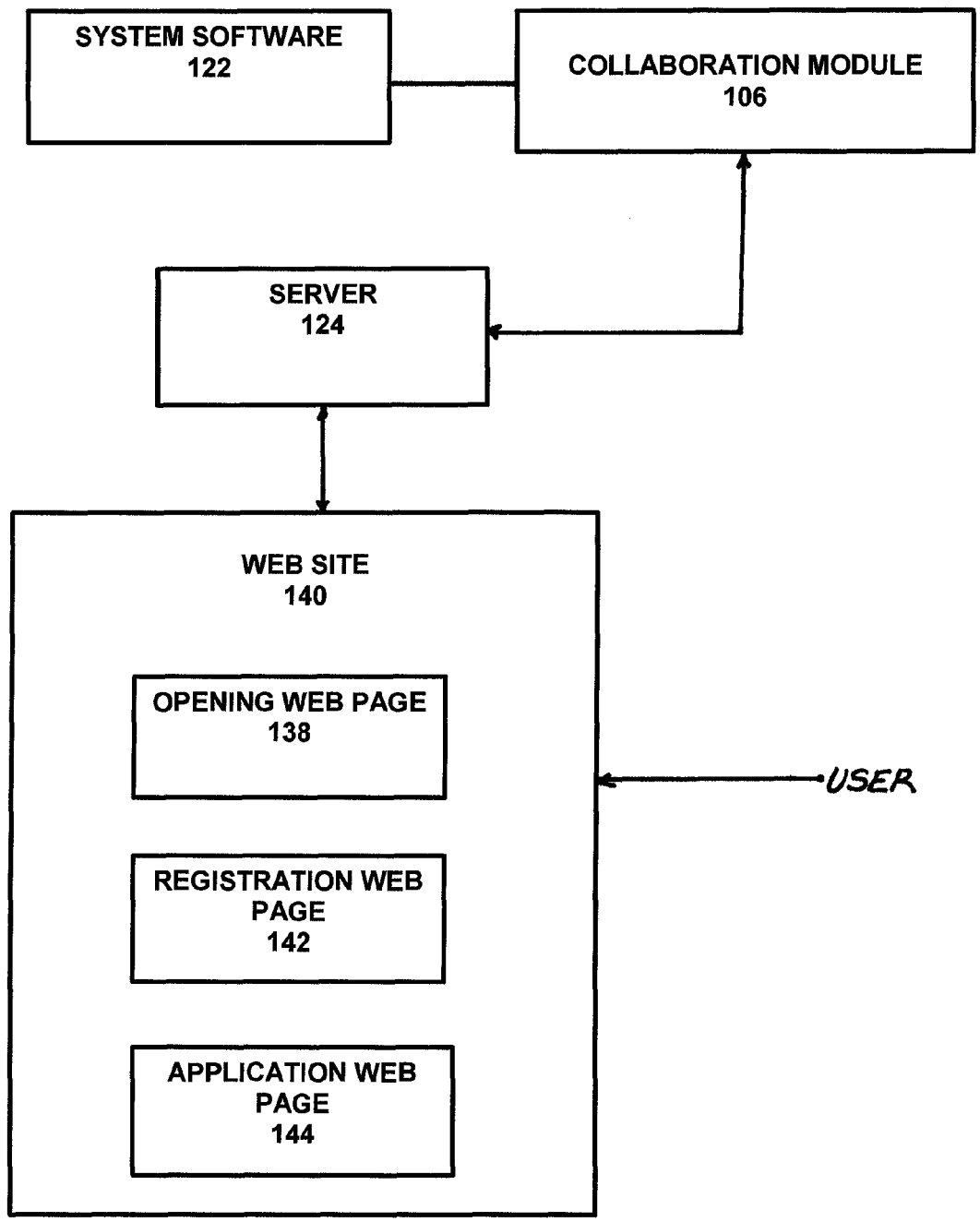
FIG. 8 is a diagrammatic representation illustrating the content collaboration module in communication with a website for use by users.

In a preferred embodiment of the invention, as shown in FIG. 8 a user wishing to utilize the system 100 first accesses the system through the content collaboration module 106 through a user's portal or access, such as through an interactive opening web-page 138 (e.g. HTML page) accessible through the Internet. The system software 127 operates to permit the user to register itself with the system and to perform the specific operations as fully described. To initiate the system, the user obtains access to system through server 124 via the Internet to obtain access to the system's website 140 hosted by the server 124.

The system software 127 directs the server to display the opening web-page 138 (e.g. HTML page) that provides the user with various options that allows a user to perform various operations such as allowing the user to add, subtract and edit the user's various hotspots in various digital video media stored within the database or cloud 108, or to download graphical labels or screens which may be conventionally superimposed into a video media, or obtain business information, such as general information of interest to businesses that may include information relating to various advertising media, available hotspot space, cost information, demographic information, and statistical information relating to the user's advertising (such as number of viewers, demographics of viewers, etc.) stored in the data bank 130 of the administrative computer system 118. The opening web-page 138 also provides means whereby the user can request to become a client for access and use of the system. Upon request by the user, such as by selecting a "sign-up" field, the content collaboration module operates to automatically direct the system server 124 to display on the user's output device 18 a registration web-page 142 (e.g. HTML page). The user can then register with the system and preferably receive a customer identification number and obtain a security password. If the user has already registered with the system, the user can at the opening web-page 138 skip the registration process after inputting the appropriate sign-in information and select an appropriate field at the opening web-page 138 to prompt the content collaboration module 106 to display on the user's output device 18 the operations 144 web-page for use by the user in creating, adding, subtracting, modifying hotspots as well as obtaining various business information.

Figure 9:
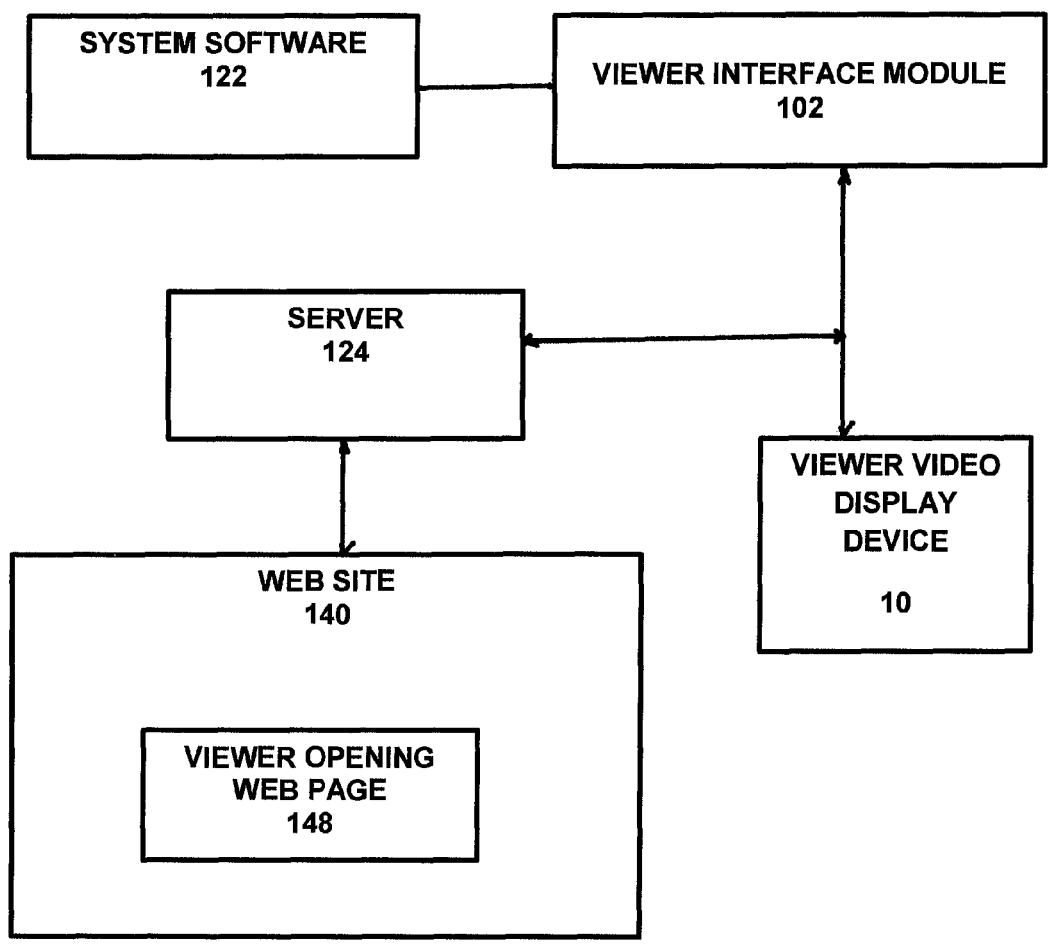
FIG. 9 is a diagrammatic representation illustrating the viewer interface module for communicating with viewers.

In a preferred embodiment of the invention, as shown in FIG. 9, a viewer wishing to utilize the system through the viewer's interface module 102 through a viewer's portal or access, such as through an interactive web-site 140 (e.g. HTML page) accessible through the Internet or the viewer's display device 10 that is connected to the Internet. The system software 122 than operates to permit the viewer to register with the system, i.e. such as by FACEBOOK, GOOGLE, TWITTER or other such Internet web services. To initiate the system, the viewer obtains access to the system through server 124 via the Internet to obtain access to the system's website 140 hosted by the server 124. The system software 122 directs the server to display a viewer opening web-page 148 (e.g. HTML page) that provides the viewer with information concerning the operation of the system and requests information from the viewer including the types of video display devices that will be used by the viewer, demographic information, and other pertinent information.

Figure 10A:
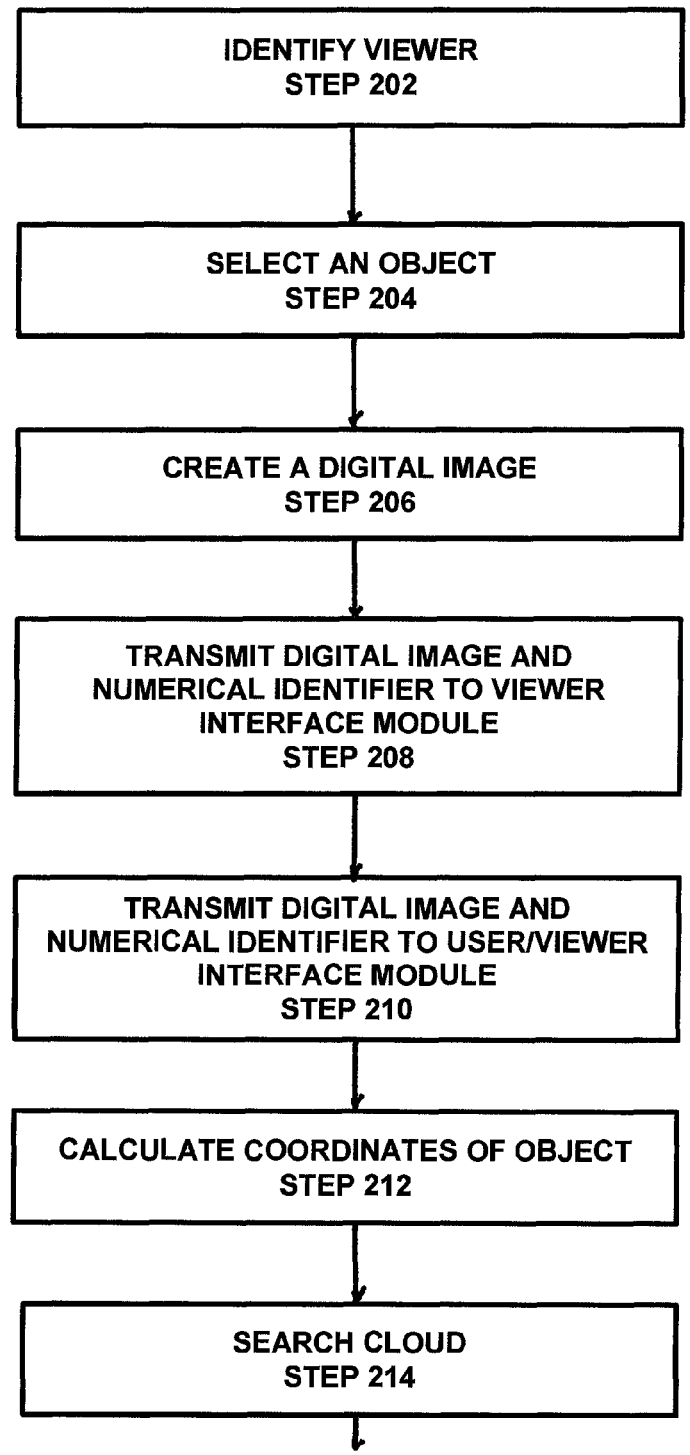
FIG. 10a is a flow diagram illustrating the general methodology of a preferred embodiment showing the procedure being directed using the system software for allowing a viewer to select an object displayed in a video media and "clicking" on the object to purchase or obtain more information on the object.
Figure 10B:
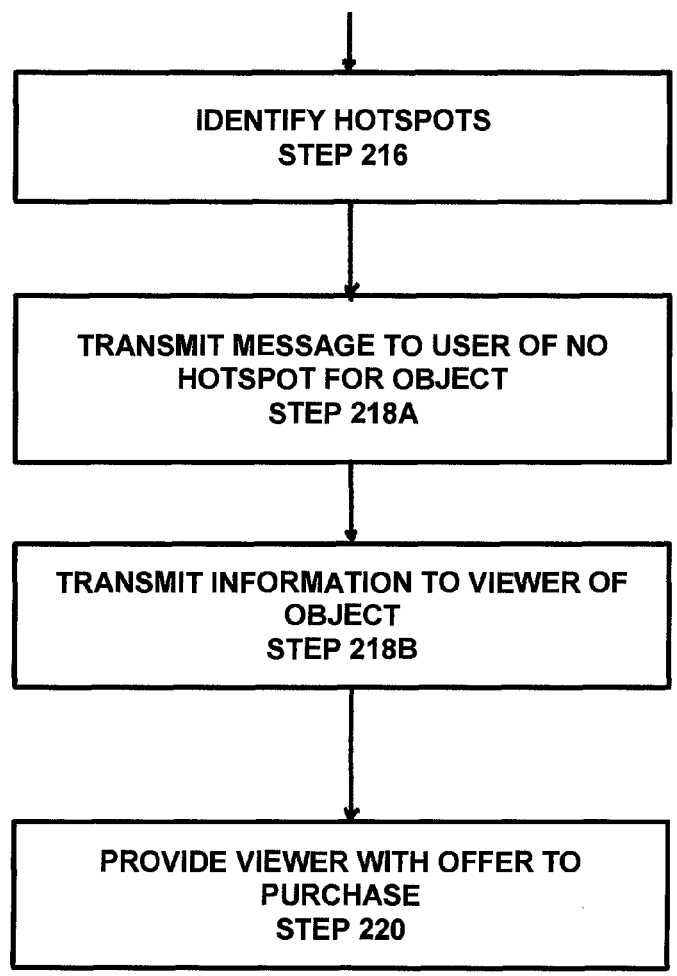
FIG. 10b is a continuation of the flow diagram of FIG. 10a illustrating the general methodology of a preferred embodiment showing the procedure being directed using the system software for allowing a viewer to select an object displayed in a video media and "clicking" on the object to purchase or obtain more information on the object.

In order to better understand how all of the various modules, components and devices cooperate and work together, the following exemplary illustration of the general overall operation of the subject invention is provided. A user through the user's video display device 10 communicates with the system 100 though the viewer interface module 102. Depending on the type of display device 10 being used by the viewer, the system software 122 directs the application programming interface 112 to utilize either the broadcast television interface 114 or the internet application interface 116 (FIG. 3). It should be understood that the viewer video display device 10 can be Internet ready such that it is in communication with the Internet or utilizes a set-top box 14 to make communication with the viewer interface module 102 via the Internet I. In a preferred embodiment, as illustrated in FIGS. 10a and 10b, the viewer has been provided with identification information such that when the viewer's display makes contact with the viewer interface module 102, the particular viewer is identified (Step 202). Preferably, the viewer's identity is automatically transmitted to the system 100, such as by use of the set-top box 14 or by the viewer video display device 10.

Figure 11:
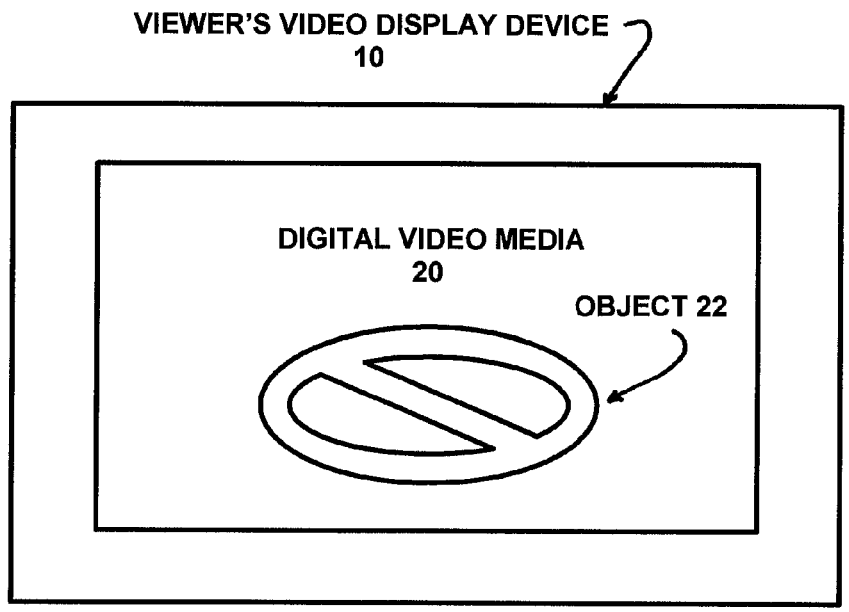
FIG. 11 is a diagrammatic representation illustrating a typical viewer's display device having a video media being displayed thereon and showing an object of interest.

As illustrated in FIGS. 10a-11, in the event a viewer is watching a video media 20 on the viewer's video display device 10, the user may utilize a cursor, mouse, touch (for touch-sensitive displays), motion (for motion-sensitive remotes) or other conventional and nonconventional means for identifying (selecting) an object 22 on the video display device 10, such as by "clicking" on the object 22 in the video media 20 (step 204). As used herein the term "clicking" shall include the selecting of an object using the appropriate means for the viewer's display device. Clicking on the object 22 causes the system software 122 to operate and create an image or "snap-shot" 150 of the video media 20 and the "clicked" object 22 (step 206) which together with identifying information is then transmitted to the viewer interface module 102 as described (step 208). Upon receiving the video image or snap-shot 150, the viewer interface module 102 operates to transmit the video image and the identifying information to the user/viewer interface module 104 (step 210). It should be understood that identifying information may include a numerical identifier 152 for the particular video media, name of the source of the video media, title, time code of the "click", dates, the positional coordinates of the "click", and other relevant information for identifying the particular video media (hereinafter referred to as the "digital image identifier"). It should be also understood that in a preferred embodiment of the invention, the viewer can "click" anywhere on the video display 24 of the video media 20 thereby operating as a message to users that can respond as described.

Figure 12:
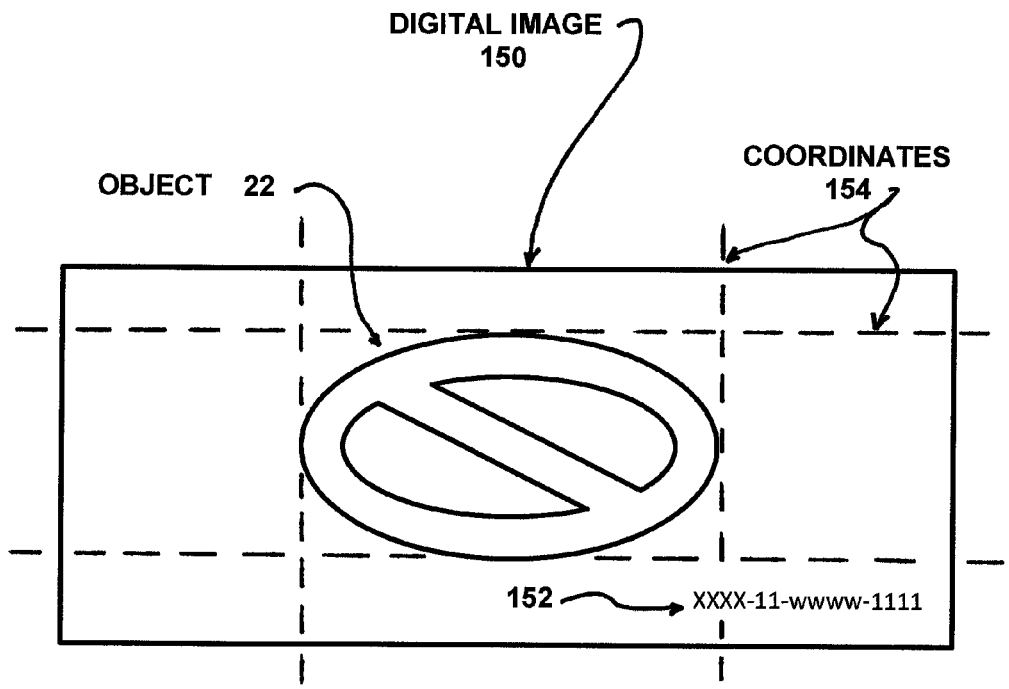
FIG. 12 is a diagrammatic representation illustrating a preferred embodiment of an image or "snap shot" taken of the video media of FIG. 11 showing the object of interest and coordinates of the object being determined in relation to the image.
Figure 13:
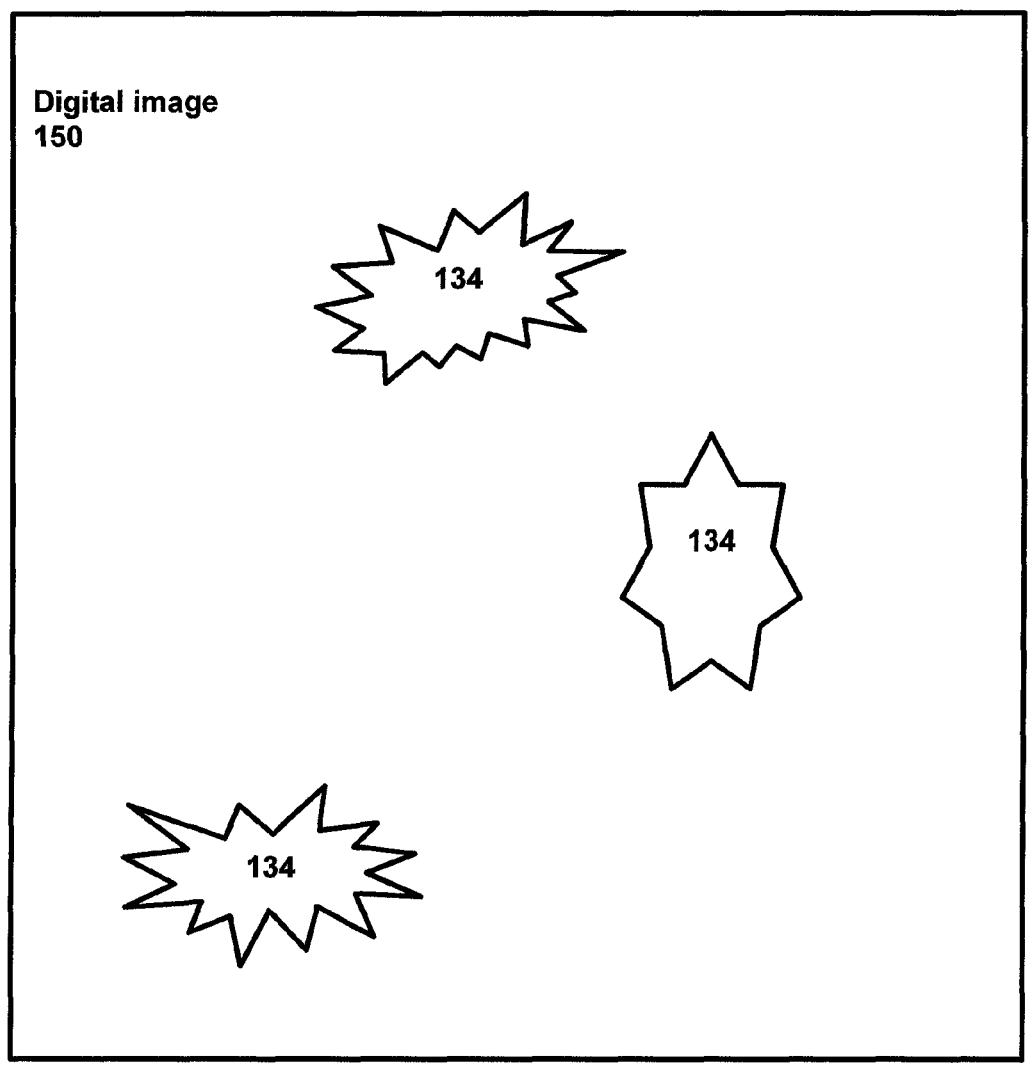
FIG. 13 is a diagrammatic representation illustrating a video image having one or more hotspots.
Figure 14:
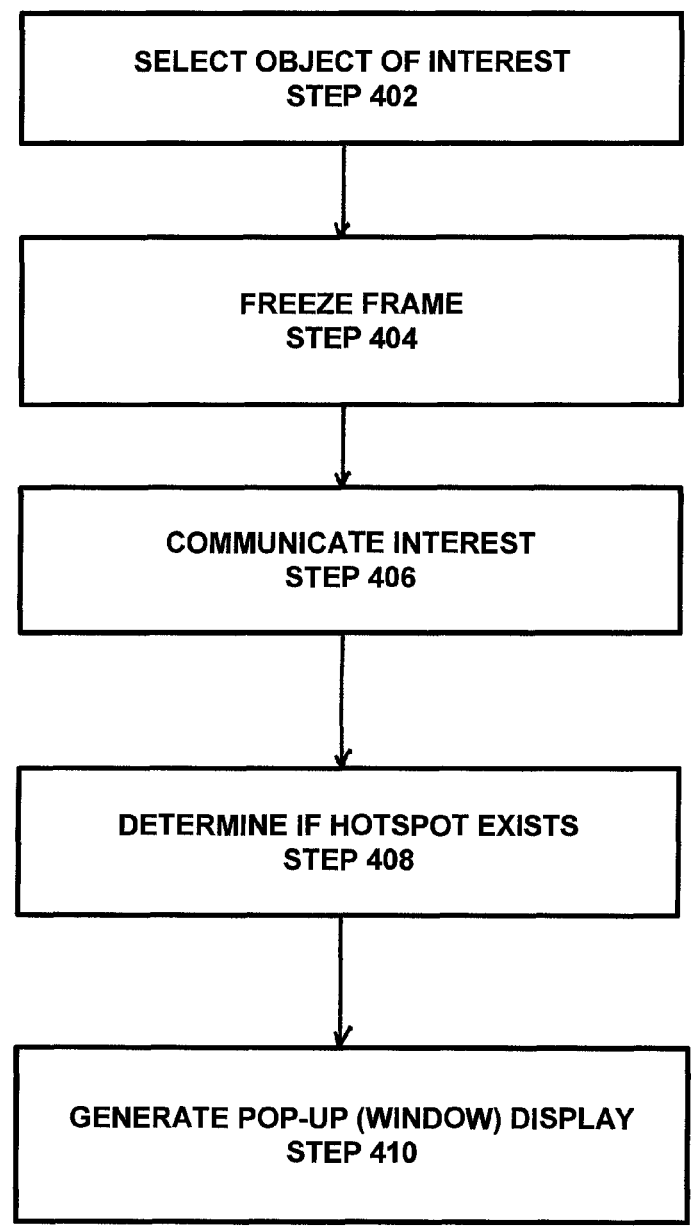
FIG. 14 is a diagrammatic illustration of a preferred embodiment of the invention showing a viewer's display device having a video media being displayed thereon.

The user/viewer interface module 104 after receiving the video image or snap-shot 150 and the numerical identifier 152, the system software 122 operates to cause the system 100 to calculate the coordinates 154 of the "clicked" object 22 identified with respect to the video image or snap-shot 150 (Step 212). The user/viewer interface module 104 also searches the database "cloud" 108 to find and obtain a copy of the video media using the video image or snap-shot 150 together with other information contained in the numerical identifier 152 as references (step 214). The system software 122 then directs the interface module 104 using the copy of the video media and the calculated coordinates 154 of the "clicked" object, identifies if a hotspot 134 (FIGS. 10 and 12) exists at the calculated coordinates 154 for the digital image or snap-shot 150 (step 216) for the object 22. If no hotspot exists for the object 22 in that particular video media 20, the user/viewer interface 104 dispatches a message to the viewer interface module 102 that receives the message and transmits the message to the viewer through the viewer's video display device 10 (step 218a) that no product information is available or other such prompt. If a hotspot 134 does exist for the object 22, the user/viewer interface 104 transmits a message to the viewer interface module 102 that receives the message and transmits the message to the viewer through the viewer's video display device 10 (step 218b) that prompts the opening of a dialogue 156 (FIG. 15) such as a window. The dialogue 156 can request additional information from the viewer, or ask if the viewer wishes to purchase the object, or if the viewer wishes to receive additional information concerning the object. It should be understood that the message to the viewer transmitted by the user/video interface 104 is not limited to any particular request but can be vary depending of the particular object selected and the user. If the viewer wishes to purchase the "clicked" object, viewer so indicates and the system software 122 activates the financial transaction module 110 such that the viewer is connected with a third-party ecommerce merchant (such as AMAZON (Amazon Services LLC), eBay (eBay Inc.), ITUNES (Apple Inc.), PAYPAL (PayPal, Inc.) and the like) for making payment for the selected object (step 220). It should be understood that if no hotspot exists for the selected object, the system can operate to track the object and the viewer and provides information to users that may be interested in responding to or contact the viewer or provides information to users that may be interested in creating a hotspot for the selected object. It should also be understood that if no hotspot exists for the calculated coordinates for the viewer's "click," the system can operate to store the information and allow a user or an automated process to review the stored information and/or allow the user to respond to the viewer. It should now also be understood that in a preferred embodiment as described above hotspots are created for live broadcasts such as by use of RFID tags attached to such objects. Accordingly, such live broadcasts are recorded, and together with the hotspots created for the live broadcasts are saved in the database "cloud" 108. Such video media and hotspots can then be used as described.

In another exemplary illustration of a preferred embodiment of the invention, as illustrated in FIGS. 10-14, a video media 20, as shown, is being played on a viewer's video display device 10. At some point during the viewing of the video media 20, the viewer selects "clicks" an object of interest 22 being shown in the video media 20 by using the appropriate device, such as a mouse, wand, pointer, touch sensitive screen or other similar device (step 402). In a preferred embodiment, selection of the object 22 causes the system software 122 to freeze the frame of the video media 20 showing the object 22 (step 404). The viewer can then determine if he/she is interested in purchasing the object 22, obtain additional information about the object or communicate with other viewers concerning the object (step 406). As previously described, the system operates to identify the object 22 and determines if a hotspot 134 exists for the selected object 22 (step 408). In a preferred embodiment of the invention the object 22 would appear as a separate frame while the video media 20 continues being shown on the rest of the viewer's video display 24 or recorded such as by the viewer's video display device 10, or use of a video recorder or other device capable of recording video (not shown). If the system determines and identifies a hotspot 134 for the selected object 22, as shown in FIGS. 10-15, the system software 122 operates to generate a dialogue or window 156 (FIG. 15) on the viewer's video display device 10 (step 410). As shown, in a preferred embodiment the object 22 selected is identified together with other information 158, such as price, manufacture, product description and the like. In another preferred embodiment of the invention, messages and data can be made available to the viewer through the viewer's display device 10 generated by the user/viewer interface module 104. This permits the viewer to receive real-time information concerning the selected object. It should be understood to one skilled in the art that the system 100 operates such that when a viewer clicks on a selected object the user/viewer interface module 104 can operate to provide users that created a hotspot for the selected object with information concerning the viewer. This information can include the viewer's contact information. In a preferred embodiment the system further operates to automatically review the information and provide an automatic response. In another preferred embodiment the information is simply reviewed by a user and the user provides a response to the viewer. In a preferred embodiment of the invention, users can provide viewers advertising that can include downloadable/printable material, such as coupons, maps, product information, and the like, such as by use of the viewer's video display device. In another preferred embodiment of the invention, users can provide the viewer an Internet link or hyperlink for allowing the viewer to view the user's web-page or bring up information, such as through the use of a "pop-up" or window.

Figure 15:
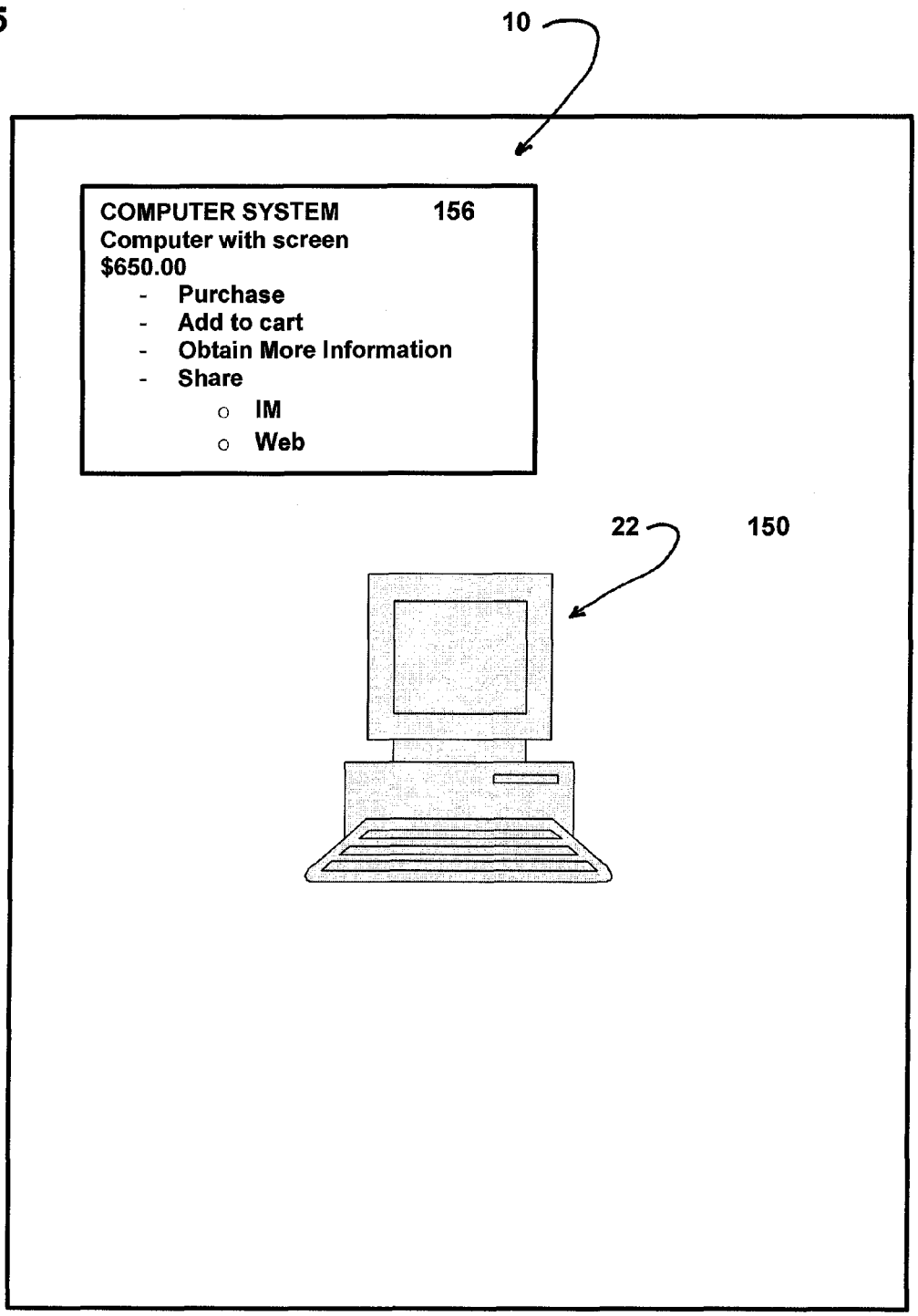
FIG. 15 is a diagrammatic illustration of a preferred embodiment of the invention showing a video image displayed on a viewer's video display device having a dialogue ("pop-up" or window) for providing the viewer with options.

In another preferred embodiment of the invention, the method and system for tracking RFID tags in three-dimensional (3D) space operates to allow viewers to exchange messages and preferably video media sharing, including computer-computer, computer-phone, phone-computer, and text messaging video media, to other viewers using conventional messaging systems, such as, but not limited to, TWITTER from Twitter, Inc., YAHOO IM from Yahoo! Inc., YOUTUBE from Google Inc., and FACEBOOK from Facebook, Inc. As shown in FIG. 15, the system operates to allow the viewer to select and utilize the desired messaging system by simply clicking onto the desired system.

It should now be understood to those skilled in the art that the subject invention is a method and system for tracking RFID tags in three-dimensional (3D) space for advertising and marketing objects in a video media. Preferably the system comprises a cloud having a plurality of hotspots, each hotspot is directed to a corresponding object, a viewer video display device operable for receiving and displaying a video media, a selection device for selecting an object in the video media, and a system framework in communication with the cloud and the viewer display device that is operable for determining if a hotspot exists for the selected object. Preferably, if a hotspot exists for the selected object, the user/viewer module directs the video display device to generate a dialogue for allowing a viewer to correspond with a user. In a preferred embodiment, the viewer video display device is selected from the group consisting of televisions, cellular telephones, computer displays, personal digital assistants, and video game consoles. In one preferred embodiment, the viewer display device is a touch screen tablet computer device, such as an IPAD or IPAD2 from Apple, Inc. The video media would be provided by a cable television operator, such as provided by Time Warner Cable, Inc. Hotspots can then be created by users and overlaid over the video media. In another preferred embodiment of the invention, the viewer display device is a touch screen tablet computer device, such as the IPAD or IPAD 2 from Apple, Inc. The video media is obtained through a website, such as HULU (www.hulu.com) in a video format such as MPEG-4 as specified by the Moving Pictures Expert Group. Hotspots can then be created by users and overlaid over the video media. In a preferred embodiment the video media would be provided by a video streaming service such as NETFLIX from Netflix, Inc. IT should now be understood to one skilled in the art that regardless of the video format provided by such a streaming service, the subject invention would operate to provide hotspots created by users that can be overlaid over the video media. In another preferred embodiment of the invention the system framework operates to allow users to add, subtract, or modify hotspots for objects stored in the cloud. Further, the system framework operates to record the demographics of viewers and video media being viewed by the viewers. Preferably, the system framework also operates to connect the viewer video display device with a user website. In a preferred embodiment of the invention the digital video media is a live broadcast.

It should now be apparent that the system and method of the subject invention permits hotspots to be created during live programing. Objects attached to RFID tags can be tracked in a 3D space and such tags can be used to create hotspots within the live programming.

It should now be apparent that by tracking RFID tags attached to objects within and moving within a defined 3D space allows hotspots to be incorporated into a live broadcast or performance.

It should also now be apparent that by incorporating hotspots into live broadcasts or performances allows a viewer to receive pertinent information about an object within the 3D space. For an illustrative example, a view can click onto a sports player being displayed during a live performance and receive information about the sports player displayed on his output display, such as a television.

A preferred embodiment of the invention is a method and system for tracking RFID tags in three-dimensional (3D) space comprising the steps of identifying a viewer, the viewer selecting an object in a video media, calculating the coordinates of the selected object, using the coordinates to identify any hotspots for the object in the video media, using the hotspot to identify the object and a user associated with the object, and providing a connection whereby a viewer can contact the user. Preferably, the video media is being displayed on a viewer's display device. In a preferred embodiment, a viewer can contact the user in the form of a dialogue, such as a window, appearing on the viewer digital display device. In another preferred embodiment, a viewer can contact the user in the form of a dialogue, such as a window, appearing on the viewer digital display device. In another preferred embodiment, the connection allows a viewer to receive and transmit messages to a user and a viewer to receive and transmit messages to other viewers. Preferably, the method includes the step of uploading graphics to be displayed over the video media.

Another preferred embodiment is a method comprising a framework for performing the steps of selecting at least one object in a video media, overlaying a hotspot for each selected object in a video media such that the hotspots overlay the video media, and viewing the video media on a viewer video display by the viewer wherein when the object is selected, the framework operates to provide communication between the user and the viewer.

It should now be apparent that the method and system for tracking RFID tags in three-dimensional (3D) space provides an interactive system having software that utilizes a graphic user interface formatted to function with a wide variety of input devices. It should now be apparent to one skilled in the art that the system allows hotspots to be incorporated across any video media, including live programming. Unlike prior methods using hotspots whereby video media are incorporated with embedded hotspots, the system of the subject invention utilizes a cloud whereby objects within a video media are selected by a viewer and are identified by the system to determine if a hotspot has been provided for the selected object. In this way the hotspots are basically overlaid onto the video media rather than incorporated into the video media. It should also now be apparent to one skilled in the art that by overlaying hotspots over the video medial (hotspot is acting independent of the video media), rather than by embedding hotspots into a video media, allows hotspots to be utilized for any video media, including live broadcasts. The system allows users to be able to access the system from any ordinary web browser to create and manage points-of-sale and advertising campaigns. Video hotspots can be linked directly to a user's existing website using standard Uniform Resource Indicator/Locator protocols. The hotspots can also be displayed as a set of visual points along a timeline displaying a time index. Further, it should also now be apparent that the system allows users to upload and import graphics that can be displayed over video in real time. Such graphics can be used as icons, banner ads, messages, or stencils that appear over-top of live television as well as recorded video media. The system software also allows for the collecting and collating of data for use by users in analyzing the effectiveness of their advertising. Further, the system operates to allow users to define parameters, such as specific demographics (geographical location, age ranges, gender, etc.).

It should now be apparent to one skilled in the art that that the subject invention solves the unique problems of real-time tracking using radio-frequency identification (RFID) tags. Since a passive RFID tag does not have a power source, it requires a transmitter to power it. This produces many factors that affect tracking. If a tag is not within the field of view of the transmitter, the tag is off. When it comes into the field, its antenna is energized and powers the device. The tag then transmits a unique ID to the transmitter. Active RFID tags can be used to track since it is able to transmit a signal regardless of which antenna is within range. However, active tags are expensive compared to passive RFID tags, and they are not as easy to incorporate within a live setting unlike a passive RFID tag. Traditional RFID readers have no knowledge of the distance the tag is from the reader. Thus, the system and method of the subject invention allows the location of an RFID tag, either a passive or an active RFID tag, in relation to the field (defined 3D space).

It should now be apparent to one skilled in the art that the method and system of the subject invention allows a viewer to select items on the screen, such as a television screen, to get more information about them. The method and system operates such that items can be tracked in real time through the use of RFID tags. The method and system allows RFID tags to be embedded in items, which will appear in a scene. The RFID tag's location can then be determined in relation to the camera and translated into coordinates on the TV screen.

RFID technology is able to detect tags in a wide variety of applications. However, until now these applications do not include successfully tracking the location of RFID tags as they move in real time using an automated system. The system and method of the subject invention operates such that products can be tracked in filmed and broadcasted settings. This automated RFID tracking system detects tags in a scene and determines the location of these tags so that this information could be used to assign particular parts of the images sent to televisions the necessary information for point and click advertising on even live broadcasts would work. It should now be apparent to one skilled in the art that the system of tracking RFID tags can be used for tracking RFID tags (objects) in both 3D space as well as 2D space. Further, the system can comprise a plurality of antennas and readers operating individually or collectively to cover a plurality of defined 3D and 2D spaces. For an illustrative example, a part leaving one defined space can be tracked as it travels through the defined space and into other defined spaces. It should now be apparent that the system and method of the subject application reduces the number of antennas, readers, and associated software typically required for tracking RFID tags through defined spaces.

It should also be understood that the system permits users and viewers to communicate through the use of various media including through web pages, Emails, TWITTER feeds, cellular transmittals, cellular text messages, Internet instant messages, and social and business network systems.

Although the foregoing invention has been described in some detail for purposes of clarity of understanding, it should be apparent that certain changes and modifications may be practiced within the scope of the appended claims. Furthermore, it should be noted that there are alternative ways of implementing the method and system for implementing the method of the present invention. Accordingly, the present embodiments and examples are to be considered as illustrative and not restrictive, and the invention is not to be limited to the details given herein, but may be modified within the scope and equivalents of the appended claims.

We claim:

1. A system for tracking RFID tags in three-dimensional (3D) space during a live performance, the system comprising:
   an apparatus for recording the live performance;
   at least one RFID tag attached to an object within a defined 3D space;
   at least one antenna attached to an assembly that operates to pan and tilt the at least one antenna such that it covers said 3D space;
   a reader for receiving a signal from said at least one RFID tag; and
   a processor in communication with said reader that operates to track the time and direction of at least one antenna and to calculate the coordinates of the at least one RFID tag within the defined 3D space at any point in time to form at least one hotspot;
   a cloud for receiving said recording of the live performance and said at least one hotspot;
   system framework operable for communicating with said cloud and a viewer display device and having system software operable for determining if a hotspot exists for a selected object;
   wherein if a hotspot exists for said selected object, said system software directs said viewer display device to generate a dialogue for allowing a viewer to correspond with a user.

2. The system of claim 1 wherein said viewer display device is selected from the group consisting of televisions, cellular telephones, computer displays, personal digital assistants, and video game consoles.

3. The system of claim 1 wherein said system framework operates to allow users to add, subtract, or modify hotspots stored in the cloud for objects in a video media.

4. The system of claim 1 wherein said system framework operates to record the demographics of viewers and video media being viewed by said viewers.

5. The system of claim 1 wherein said video media is a live broadcast.

6. The system of claim 1 wherein said at least one RFID tag is a passive RFID tag.

7. The system of claim 1 wherein the at least one antenna is a directional antenna.

8. A method for tracking RFID tags in a three-dimensional (3D) space comprising the steps of:
   placing a RFID tag on an object;
   using at least one directional antenna that operates to pan and tilt the at least one antenna such that it covers the 3D space and tracks the RFID tag as it travels within the 3D space;
   using a reader to receive a signal from the RFID tag and track the time and direction of at least one directional antenna and operates to calculate the coordinates of the RFID tag within the defined 3D space at any point in time to form at least one hotspot for the object;
   storing the hotspot in a cloud;
   identifying a viewer;
   the viewer selecting an object in a video media;
   calculating the coordinates of the selected object;
   using the coordinates to identify a hotspot for the object in the cloud;
   transferring information concerning the object associated with the hotspot to the viewer.

9. The method of claim 8 further comprising the step of forming a connection between the viewer and a user in the form of a dialogue appearing on a viewer digital display device.

10. The method of claim 9 wherein the connection further operates to allow the viewer to receive and transmit messages to other viewers.

11. The method of claim 8 further comprising the step of uploading graphics to be displayed over the video media.

12. The method of claim 8 wherein said video media is a live broadcast.

13. A system for tracking a RFID tag in three-dimensional (3D) space during a live performance, the system comprising:
   a directional antenna having a direction for receiving signals;
   a mechanism coupled to said directional antenna for changing said direction of said directional antenna; and
   a reader coupled to a processor that operates to transmit a signal to the RFID tag into the 3D space;
   wherein upon receiving said signal, the RFID tag transmits a modulated RFID signal;
   wherein said reader is connected to said directional antenna and operates to constantly scan the 3D space and receive said modulated RFID signal from the RFID tag, wherein said signal includes a unique tag ID; and
   wherein when said modulated signal is received by the directional antenna, said unique tag ID and the direction of the directional antenna are recorded by said reader; and
   wherein said processor uses said unique tag ID, and a total transmission time comprising time for the signal to be transmitted by the reader and receive by the RFID tag and time for the modulated signal to be transmitted and received by the reader, and said direction of said directional antenna to obtain coordinates of the RFID tag at a point in time.

14. The system of claim 13 wherein strength of said modulated signal that can be received by said directional antenna is varied and wherein said signal strength is used by said processor to determine the distance between said directional antenna and the RFID tag.

* * * * *